| United States Patent [19] | [11] Patent Number: 4,582,623 |
| Kubo et al. | [45] Date of Patent: Apr. 15, 1986 |

[54] BARIUM FERRITE MAGNETIC POWDER AND RECORDING MEDIUM EMPLOYING THE SAME

[75] Inventors: Osamu Kubo; Tutomu Nomura, both of Yokohama; Tadashi Ido, Ebina, all of Japan

[73] Assignee: Kabushiki Kaisha Toshiba, Kawasaki, Japan

[21] Appl. No.: 646,165

[22] Filed: Aug. 31, 1984

[30] Foreign Application Priority Data

Sep. 30, 1983 [JP] Japan .................................. 58-180396

[51] Int. Cl.$^4$ ............................................. C04B 35/36
[52] U.S. Cl. ................................ 252/62.59; 252/62.63; 423/594
[58] Field of Search ...................... 425/406; 252/62.58, 252/62.59, 62.63; 423/594

[56] References Cited

U.S. PATENT DOCUMENTS

| Re. 26,153 | 1/1967 | Cochardt | 252/62.5 |
| 3,833,412 | 9/1974 | Akashi et al. | 117/240 |
| 3,859,130 | 1/1975 | Parker et al. | 117/240 |
| 4,025,449 | 5/1977 | Pezzoli et al. | 252/62.63 |
| 4,493,874 | 1/1985 | Kubo et al. | 428/406 |

FOREIGN PATENT DOCUMENTS

| 494716 | 2/1974 | Japan . | |
| 0086444 | 8/1983 | European Pat. Off. | H01F/136 |

OTHER PUBLICATIONS

European Search Report.

*Primary Examiner*—John L. Goodrow
*Attorney, Agent, or Firm*—Schwartz, Jeffery, Schwaab, Mack, Blumenthal & Evans

[57] ABSTRACT

Disclosed is a barium ferrite magnetic powder comprising particles characterized by (A) a mean particle size of 0.3 μm or smaller and (B) the presence of Sr, Ca and Si in respective amounts of 0.2 wt. % or less as SrO, 0.15 wt. % or less as CaO, and 0.3 wt. % or less as $SiO_2$. Also disclosed is a recording medium comprising the barium ferrite magnetic powder.

8 Claims, No Drawings

BARIUM FERRITE MAGNETIC POWDER AND RECORDING MEDIUM EMPLOYING THE SAME

BACKGROUND OF THE INVENTION

This invention relates to barium ferrite magnetic powder, and more specifically to barium ferrite magnetic powder having fine particle sizes with narrow particle size distribution and an effectiveness for high-density recording, and also to a recording medium employing the same.

Magnetic recording media which have hitherto been used in video recording, digital recording, etc. were those obtained by coating acicular magnetic particles such as $\gamma$-$Fe_2O_3$, $CrO_2$ or the like on a substrate and then orienting the same. Such a process requires that the particle size of magnetic particles be significantly smaller than a minimum recording unit in order to obtain a sufficiently high S/N ratio. In the case of the presently available video recording for example, acicular magnetic powder having a length of about 0.3 $\mu$m is used for the shortest recording wavelength of about 1 $\mu$m. It is desired in recent years to improve the recording density further. Reflecting such a demand, it is strongly desired to obtain magnetic powder having a still finer particle size than the currently available acicular magnetic powder.

Magnetic powder having a uniaxial easy axis of magnetization is preferred as magnetic powder for magnetic recording. Namely, in current recording, uniaxial anisotropy has been imparted to the magnetic recording layer and signals are recorded in the direction of the easy axis of magnetization.

For the reasons mentioned above, recording media are generally used which have individually been obtained by dispersing and orienting magnetic powder having a uniaxial easy axis of magnetization in such a way that the recording direction becomes parallel to the direction of the easy axis.

As such magnetic powder, hexagonal ferrites led by barium ferrite are attracting attention in place of such acicular magnetic powde as $\gamma$-$Fe_2O_3$ and $CrO_2$. These hexagonal ferrites may be considered as magnetic powder inherently suitable for high-density recording, because each of the hexagonal ferrites has a hexagonal, plate-like shape with a uniaxial easy axis of magnetization extending in a direction perpendicular to the plane of the plate-like shape and hence permits the perpendicular magnetization and recording.

As a method for production of such magnetic barium ferrite powder, the glass crystallization method is known.

This method comprises melting the oxides and/or carbonates of various elements required for an intended barium ferrite together with a glass-forming material such as boric acid for example, quenching the resulting melt to form an oxide glass, subjecting the oxide glass to a heat treatment at predetermined temperatures to allow powdery crystals of the intended barium ferrite to precipitate and finally removing the glass component in an acid bath (as disclosed in U.S. Pat. No. 4,341,648).

In general, when producing barium ferrite, $BaCO_3$, $BaCl_2$ and the like are used as barium (Ba) sources. Strontium (Sr) and calcium (Ca), which belong to the same Group as Ba, are contained in such Ba sources although their concentrations are low. In usual cases, these elements are contained in amounts of 2 to 5 wt.% as SrO and CaO, based on the principal component BaO, unless they are removed intentionally. When such a material whose SrO and CaO contents are not controlled is used to produce the barium ferrite, Sr and Ca are inevitably contained in it in amounts of about 0.3 to about 0.7 wt.% as SrO and CaO, respectively.

There has been no report that inclusion of such inevitable elements will impair the magnetic characteristics of the barium ferrite, so long as the particle sizes of the barium ferrite magnetic powder are on such an order of micrometers as used in a usual barium ferrite sintered body or in a low-density recording. However, as a result of intensive studies by the present inventors, it was found that when the barium ferrite powder is used in the mean particle size of 0.3 $\mu$m or less for the purpose of high-density recording, the Sr and Ca components contained as impurities extremely impair the characteristics of the barium ferrite.

Furthermore, silicon dioxide ($SiO_2$) is generally caused to mix in the barrium ferrite as an impurity from a starting $Fe_2O_3$ material or as an impurity from a melting crucible to be used when melting raw materials. This $SiO_2$ is a component generally capable of increasing the sintered density in a usual sintered body. In the case of magnetic powder on the other hand, an inclusion of $SiO_2$ in an amount of 0.5 to 1 wt.% or so makes crystalline particles smaller and hence increases the coercive force, and thus it is used positively as a useful additive.

However, where the mean particle sizes of magnetic powder are 0.3 $\mu$m or smaller, which is required to render the magnetic powder useful for high-density magnetic recording, an inclusion of $SiO_2$ will, different from the case of sintered bodies, make the particle sizes of crystals of the magnetic powder coarser and at the same time, will result in a reduction to the saturation magnetization even if its content is of the impurity level.

SUMMARY OF THE INVENTION

The present inventors have discovered that, upon producing of barium ferrite magnetic powder having mean particle sizes of 0.3 $\mu$m or smaller and suitable for high-density magnetic recording, an inclusion of Sr and Ca in amounts exceeding their predetermined levels in a Ba source, as specified below, lowers significantly the saturation magnetization of magnetic powder to be obtained. The coarsening of the crystalline particles is also promoted, thereby lowering the reproduction output of the magnetic recording medium and increasing the noise level thus resulting in a reduction to the S/N ratio. An inclusion of $SiO_2$ in an amount more than 0.3 wt.% also produces the inconveniences mentioned above. Based on these findings, the development of the barium ferrite powder of the present invention has been made.

An object of this invention is to provide barium ferrite magnetic powder suitable for high-density magnetic recording.

Another object of this invention is to provide a recording medium employing such a barium ferrite magnetic powder.

The barium ferrite magnetic powder of this invention is characterized in that its mean particle size is 0.3 $\mu$m or smaller, practically 200 angstrom to 0.3 $\mu$m, and Sr, Ca and Si are contained in amounts of 0.2 wt.% or less as strontium oxide (SrO), 0.15 wt.% or less as calcium oxide (CaO) and 0.3 wt.% or less as silicon dioxide ($SiO_2$), respectively.

DESCRIPTION OF THE PREFERRED EMBODIMENTS

Any mean particle sizes greater than 0.3 μm are not suited for the intended high-density magnetic recording.

If Si, Ca and Si should be contained as SrO, CaO or $SiO_2$ in amounts exceeding 0.2 wt.%, 0.15 wt.% and 0.3 wt.%, respectively, in the magnetic powder, crystalline particles of barium ferrite are rendered coarser in the course of its production and the proportion of particles of 0.3 μm or larger will increase. Moreover, the width of its particle size distribution becomes greater and particle sizes are scattered more significaantly, and the saturation magnetization of the resulting magnetic powder is lowered. A magnetic recording medium making use of the magnetic powder is reduced in its S/N ratio.

The magnetic powder of this invention can be readily prepared by controlling the Sr and Ca contents in raw materials, notably in a Ba source, and controlling the level of $SiO_2$ in $Fe_2O_3$ material or in its preparation step. In preparing the magnetic powder used in this invention, it is preferred to make use of the aforementioned glass crystallization method. In such a case, it is preferred to use boron oxide ($B_2O_3$) as a glass forming material, barium oxide (BaO) as a Ba source and ferric oxide ($Fe_2O_3$) as a ferrite source, namely, to employ a $B_2O_3$-BaO-$Fe_2O_3$ glass as the basic component of the oxide glass.

The magnetic powder of this invention preferably has a coercive force in the range of 200 to 2,000 Oe. Thus, Fe is partially substituted with Ti, Co and/or the like upon preparation of the magnetic powder. Specifically speaking, this may be achieved by incorporating suitable amounts of $TiO_2$, CoO and/or the like in the aforementioned raw materials.

This invention will be described below in greater detail by the following Examples.

EXAMPLE 1

Glass samples having the composition of 31 mole % of $B_2O_3$, 39 mole % of BaO and 30 mole % of $Fe_2O_3$ were prepared respectively by using as principal raw materials $BaCO_3$ which contained SrO and CaO at different levels, $B_2O_3$, and $Fe_2O_3$ which contained $SiO_2$ at different levels, adding small amounts of $TiO_2$ and CoO to substitute a portion of the Fe and to adjust the coercive forces to about 800 Oe, and heating and melting the resultant mixtures and then quenching the thus-obtained melts. Each of the above-obtained glass samples was then heated at 800° C. for 4 hours, thereby causing particulate barium ferrite crystals to precipitate in the matrix. The resulting mass was finally washed with acetic acid to obtain magnetic powder of barium ferrite.

After measuring the saturation magnetization, mean particle size and maximum particle size of each of the above-prepared samples of magnetic powder, the magnetic powder samples were respectively formulated into magnetic coating formulations and then applied onto base films to prepare magnetic tapes.

With respect to each of the tapes, was measured at a recording wave number of $1 \times 10^4$ cm$^{-1}$ its S/N ratio upon recording and reproducing by a ring-shaped head.

Test results are shown in Table 1.

As is seen from Sample Nos. 1 to 5 in Table 1, when the content of SrO is not more than 0.2 wt.%, particles are sufficiently fine (0.08 μm in the mean particle size) and the maximum partilce size is 0.15 at most, thereby making the particle size distribution very sharp. In spite of this, moreover, the saturation magnetization is as large as 62 emu/g. S/N ratio is also sufficiently large. On the other hand, when the SrO content exceeds 0.2 wt.%, the saturation magnetization becomes smaller, and also the maximum particle size becomes larger with the result that the particle size distribution is more scattered. S/N ratio is abruptly lowered at the SrO content exceeding 0.2 wt.%.

Also, in Sample Nos. 6 to 10 and Sample Nos. 11 to 15, similar results are obtained when the contents of CaO and $SiO_2$ are not more than 0.15 wt.% and 0.3 wt.%, respectively, and when the CaO and $SiO_2$ exceeds 0.15 wt.% and 0.3 wt.%, respectively.

TABLE 1

| Sample No. | Impurities (wt. %) | | | Saturation magnetization (emu/g) | Mean particle size (μm) | Maximum particle size (μm) | Relative S/N ratio of tape (dB) |
| --- | --- | --- | --- | --- | --- | --- | --- |
| | SrO | CaO | $SiO_2$ | | | | |
| 1 | 0.070 | 0.140 | 0.220 | 62 | 0.08 | 0.15 | 0 |
| 2 | 0.125 | ″ | ″ | 62 | 0.08 | 0.15 | 0 |
| 3 | 0.196 | ″ | ″ | 62 | 0.08 | 0.15 | 0 |
| 4 | 0.252 | ″ | ″ | 57 | 0.11 | 0.33 | −3.8 |
| 5 | 0.310 | ″ | ″ | 55 | 0.15 | 0.40 | −6.7 |
| 6 | 0.120 | 0.073 | 0.200 | 62 | 0.08 | 0.15 | 0 |
| 7 | ″ | 0.145 | ″ | 62 | 0.08 | 0.15 | 0 |
| 8 | ″ | 0.155 | ″ | 57 | 0.10 | 0.30 | −3.9 |
| 9 | ″ | 0.198 | ″ | 50 | 0.13 | 0.40 | −7.6 |
| 10 | ″ | 0.250 | ″ | 40 | 0.15 | 0.46 | −10.2 |
| 11 | 0.120 | 0.140 | 0.17 | 62 | 0.08 | 0.15 | 0 |
| 12 | ″ | ″ | 0.22 | 62 | 0.08 | 0.15 | 0 |
| 13 | ″ | ″ | 0.29 | 62 | 0.08 | 0.15 | 0 |
| 14 | ″ | ″ | 0.35 | 57 | 0.10 | 0.31 | −0.36 |
| 15 | ″ | ″ | 0.42 | 54 | 0.12 | 0.41 | −6.5 |

As is apparent from the above description, the barium ferrite magnetic ppowder of this invention features small particle sizes while enjoying narrow particle size distribution and high saturation magnetization. Therefore, a magnetic tape making use of the above magnetic powder has a high S/N ratio and is hence suitable for high-density magnetic recording.

We claim:

1. A barium ferrite magnetic powder comprised of particles having a mean particle size of 0.3 μm or less, said particles containing strontium, calcium and silicon in an amount of 0.2 wt.% or less as strontium oxide, 0.15 wt.% or less as calcium oxide and 0.3 wt.% or less as silicon dioxide, respectively.

2. The barium ferrite magnetic powder according to claim 1, wherein the coercive force of said barium ferrite magnetic powder ranges from 200 to 2,000 Oe.

3. The barium ferritge magnetic powder according to claim 1, wherein said barium ferrite magnetic powder is obtained by a glass crystallization method.

4. The barium ferrite magnetic powder according to claim 3, wherein the basic component of an oxide glass used in said glass crystallization method is a boric acid—barium oxide—ferric oxide base glass.

5. A recording medium comprising a barium ferrite magnetic powder, wherein said magnetic powder comprises particles having a mean particle size of 0.3 μm or smaller and containing strontium, calcium and silicon in an amount of 0.2 wt.% or less as strontium oxide, 0.15 wt.% or less as calcium oxide and 0.3 wt.% or less as silicon dioxide, respectively.

6. The recording medium according to claim 5, wherein the coercive force of said barium ferrite magnetic powder ranges from 200 to 2,000 Oe.

7. The recording medium according to claim 5, wherein said barium ferrite magnetic powder is obtained by a glass crystallization method.

8. The recording medium according to claim 3, wherein the basic component of an oxide glass used in said glass crystallization method is a boric acid—barium oxide—ferric oxide base glass.

* * * * *